(12) United States Patent
Vacher et al.

(10) Patent No.: US 8,742,925 B2
(45) Date of Patent: Jun. 3, 2014

(54) DEVICE FOR PREVENTING AND DETECTING THE FALLING OF AN OBJECT ON A RAILWAY LINE, AND METHOD FOR DETECTING THE FALLING OF AN OBJECT ON THE LINE

(75) Inventors: Charlie Vacher, Paris (FR); Michel Carnot, Rueil-Malmaison (FR)

(73) Assignee: Alstom Transport SA, Levallois Perret (FR)

( * ) Notice: Subject to any disclaimer, the term of this patent is extended or adjusted under 35 U.S.C. 154(b) by 787 days.

(21) Appl. No.: 12/952,840

(22) Filed: Nov. 23, 2010

(65) Prior Publication Data
US 2011/0126731 A1 Jun. 2, 2011

(30) Foreign Application Priority Data

Nov. 26, 2009 (FR) ...................... 09 58420

(51) Int. Cl.
G08B 21/00 (2006.01)
B61B 1/02 (2006.01)
(52) U.S. Cl.
USPC ........... 340/540; 340/518; 340/552; 340/556; 604/31; 604/30
(58) Field of Classification Search
USPC ........... 340/540, 518, 539.1, 552, 561, 573.1, 340/545.3, 556; 104/27, 28, 30, 31, 331, 104/332; 105/331, 332, 333; 604/27, 28, 604/30, 31
See application file for complete search history.

(56) References Cited

U.S. PATENT DOCUMENTS

| | | | |
|---|---|---|---|
| 7,802,521 B2 * | 9/2010 | Gunes | 104/30 |
| 7,978,071 B2 * | 7/2011 | Abeele et al. | 340/552 |
| 8,387,541 B2 * | 3/2013 | Losito | 104/30 |

FOREIGN PATENT DOCUMENTS

| | | |
|---|---|---|
| DE | 200 20 009 U1 | 3/2001 |
| EP | 1 911 656 A1 | 4/2008 |
| WO | 98/41432 A1 | 9/1998 |
| WO | 2005/007479 A1 | 1/2005 |
| WO | 2005/102808 A1 | 11/2005 |

* cited by examiner

Primary Examiner — Hung T. Nguyen
(74) Attorney, Agent, or Firm — Sughrue Mion, PLLC

(57) ABSTRACT

A device (1) for preventing and detecting the falling of an object or of a person on a line (2) of a railway station having a platform (3). The device (1) includes at least one detection device (7) having at least one emitter (8) of a beam (10) and a sensor (9) able to detect the beam (10), and a detection calculator (13) for processing the signals obtained from the sensors (9) and able to communicate safely with at least one signaling system (16a, 16b, 16c) of the railway station, barriers (4) able to be arranged on the platform (3) to prevent falls of the object or of the person, the barriers (4) delimiting between door opening areas (5), a detection device (7) being arranged in each of the door opening areas (5) to detect a fall on the line (2) of the railway station.

13 Claims, 2 Drawing Sheets

DEVICE FOR PREVENTING AND DETECTING THE FALLING OF AN OBJECT ON A RAILWAY LINE, AND METHOD FOR DETECTING THE FALLING OF AN OBJECT ON THE LINE

BACKGROUND OF THE INVENTION

1. Field of the Invention

The present invention relates to a device for preventing and detecting the falling of an object in a monitored area, and in particular on a railway line, and to a method for detecting the falling of an object on a railway line.

2. Background

In order to detect the falling of an object on a railway line, for example in a subway station, it is known to use a video camera placed above the railway lines. This solution is not, however, totally satisfactory because it requires significant and costly installation and servicing operations, and because it does not operate correctly if the viewing angle of the camera is masked.

Another known solution is to arrange a plurality of light-emitting diodes along the railway line, for example a diode every 25 cm. The diodes emit beams whose interruption can be detected. This solution entails a large number of diodes and detectors, which also involves significant and costly installation and servicing operations.

Another known solution for preventing the falling of objects or of people is to arrange over the entire length of the platform a system of landing doors, with alternating fixed physical barriers and moving doors in door opening areas designed to coincide with the doors of a train stopped at the platform, the opening of the doors of the train controlling the opening of the platform's landing doors. This solution presents the drawback of requiring a large quantity of equipment comprising motors and cables for opening the landing doors, also requiring significant and costly installation and servicing operations.

SUMMARY OF THE INVENTION

The aim of the invention is to provide a device for preventing and detecting the falling of an object in a railway line detection area, which does not present at least some of the abovementioned drawbacks from the prior art.

For this, the invention provides a device for preventing and detecting the falling of an object or of a person on a line of a railway station having a platform, comprising at least one detection device having at least one emitter of a beam and a sensor able to detect this beam, and a detection calculator (integrated or not in a computer replaced by a computer, said term being understood as any computer/electronic means appropriate for performing the required steps) for processing the signals obtained from the sensors and able to communicate safely with at least one signaling system of the station. This device comprises barriers able to be arranged on the platform to prevent falls, the barriers delimiting between door opening areas, a detection device being arranged in each of the door opening areas to detect a fall on the line of the railway station.

The device according to the invention also preferably offers at least one of the following features:

the outputs of the sensors are connected to at least one input port of the detection calculator, which is either in an "activated" state in which the signals obtained from the sensors are processed, or in a "deactivated" state in which the signals obtained from the sensors are not processed, the device comprises at least one device for detecting entry into the station able to be arranged in at least one area of the platform closed off by a barrier, the device for detecting entry into the station comprises at least one emitter of a beam and a plurality of sensors able to detect this beam, the sensors being arranged over at least the entire length of the door opening area, the outputs of the sensors of the device for detecting entry into the station are connected to at least one input port of the detection calculator, the detection calculator is able to process the signal obtained from the sensors of the device for detecting entry into the station to modify the state of the input port, the detection calculator is able to process information concerning the position of a vehicle traveling on the line to modify the state of the input port, the detection calculator is able to prevent or allow the entry into the station of a vehicle according to the state of the input port and the signals emitted by the sensors of the fall detection device, by means of information sent to the signaling system, the detection calculator is connected to an energy supply control device of the station and able to order the cutting-off of the energy supply to the station according to the state of the input port and the signals emitted by the sensors of the fall detection device, by means of information sent to said energy supply control device.

The invention also relates to a method for detecting the falling of an object or of a person on a line of a railway station having a platform comprising a prevention and detection device according to the invention, comprising steps consisting in detecting the cutting-off of at least one beam from at least one fall detection device, safely emitting information preventing entry into the station to at least one signaling system on the line or on board, sending an alarm to a central signaling system.

The method according to the invention also preferably comprises at least one of the following steps:

a step for cutting off the station's energy supply, a step for detecting the approach of a vehicle to the station, a step in which the detection calculator modifies the state of the input ports when the approach of a vehicle is detected, so as to no longer process the signals for cutting off at least one beam emitted by at least one sensor of the fall detection device.

BRIEF DESCRIPTION OF THE DRAWINGS

Other aims, features and advantages of the invention will become apparent from reading the description of embodiments of the invention, in conjunction with the drawings in which.

DETAILED DESCRIPTION OF THE PREFERRED EMBODIMENTS OF THE INVENTION

In order to make it easier to read the drawings, only the elements that are necessary for an understanding of the invention are represented. The same elements are given the same references from one drawing to another.

In the description, the terms "vertical" and "horizontal" are defined relative to the platform of a railway station. Thus, a horizontal plane is substantially parallel to the plane in which the platform extends and the vertical plane is substantially perpendicular to the horizontal plane. The term "longitudinal" is defined relative to the direction in which a rail vehicle travels in a horizontal plane and the term "transversal" is defined according to a direction substantially perpendicular to the longitudinal direction in a horizontal plane.

Figure 1:
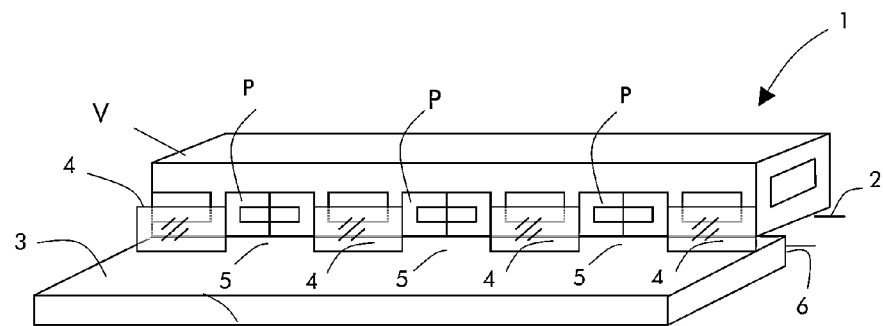
FIG. 1 is a diagrammatic view of a part of the prevention and detection device when a vehicle is at the platform.
Figure 2:
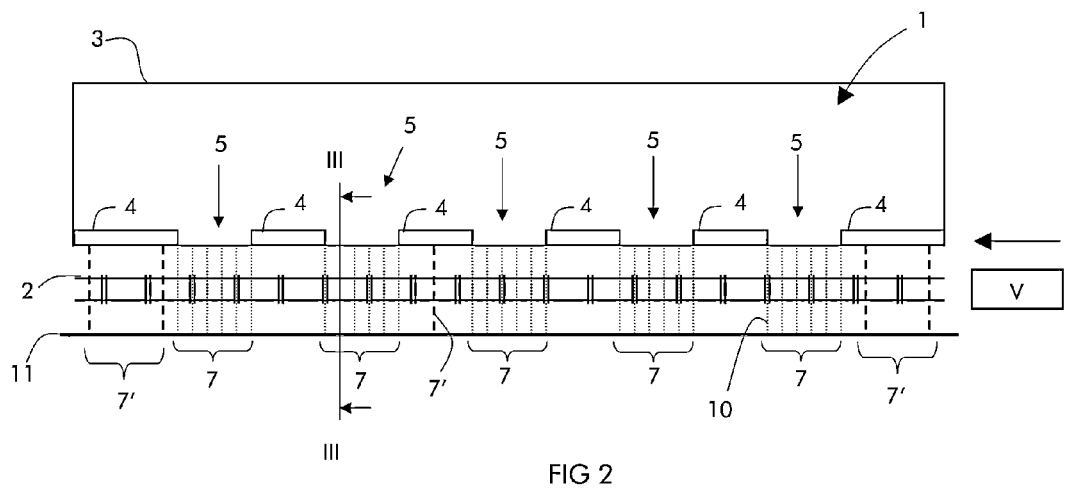
FIG. 2 is a diagrammatic plan view of the prevention and detection device when a vehicle is entering the station.

Referring to FIGS. 1 and 2, the device 1 for preventing and detecting the falling of an object or of a person on a railway line 2 of a subway station having a platform 3 comprises physical barriers 4 arranged on certain areas of the platform 3, delimiting between the areas called door opening areas 5. These are arranged so as to coincide with the doors P of a railway vehicle V stopped at the station. The barriers 4 are rigidly fixed to the platform, as close as possible to the shoulder 6 of the platform 3. If necessary, they include a transversal return preventing anyone from penetrating into the space contained between the shoulder 6 of the platform 3 and the barrier 4. The barriers 4 are, for example, glazed bays or glazed doors held in a rigid frame that is fixed relative to the platform, low walls or any other construction that is fixed relative to the platform 3 and of sufficient height to prevent a person from falling from the platform onto the line 2.

Thus, the barriers 4 are not movable relative to the platform 3, although they may include movable elements, notably to allow for an emergency evacuation. For example, the barriers may include doors equipped with anti-panic bars arranged on the face oriented toward the line, which can be actuated only by passengers on board a vehicle whose doors are stopped in error in front of the barriers. In normal operation, the doors do not open because neither the passengers on the platform nor the passengers in the vehicle have access to the opening systems of such doors.

The barriers 4 thus constitute the prevention device of the system according to the invention, over a part of the length of the platform 3.

Figure 3A:
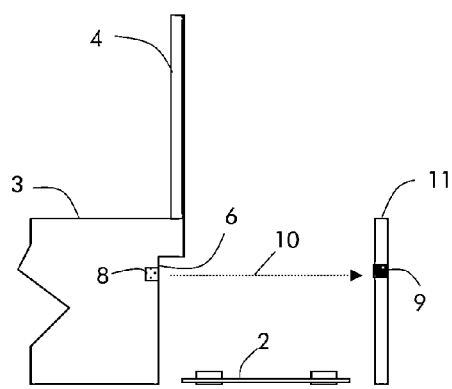
FIGS. 3a and 3b are diagrammatic representations of two embodiments of the device, taken in cross-section along the axis III-III of FIG. 2.
Figure 3B:
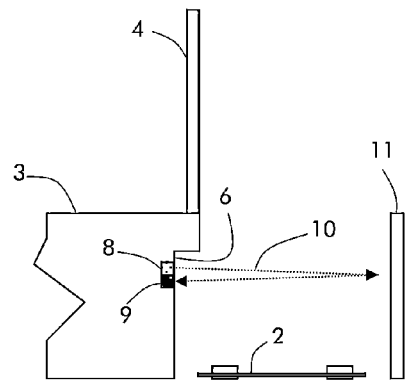

Referring to FIGS. 2, 3a and 3b, the fall prevention and detection device 1 also comprises a fall detection device 7 arranged in each door opening area 5. Each fall detection device 7 consists of a series of emitters 8 and sensors 9—a sensor 9 being associated with an emitter 8—arranged every 5 to 30 cm, and, preferentially, every 10 to 20 cm, under the shoulder 6 of the platform 3, so as to cover at least the entire length of the door opening area 5. Preferentially, the sensors 9 also cover a small part of the platform 3, on each side of the door opening area 5, in order to detect a fall very close to the barriers 4. The choice of the spacing of the emitters and sensors is a trade-off between the size of the objects or people to be detected and the cost of the system. The emitters 8 may emit infra-red or radio beams 10 (or any other type, indicated by broken lines in FIGS. 2, 3a, 3b and 3c), the sensors 9 then being designed to detect these beams. The beams 10 that are emitted may be received either directly by a sensor 9 fixed to a wall 11 arranged opposite the platform 3 relative to the line 2, or indirectly by a sensor 9, also fixed under the shoulder 6 of the platform 3, the beams 10 being reflected by the wall 11. When the station has two platforms arranged either side of a central platform, the wall 11 consists of one of the walls of the station tunnel. When the station has two platforms facing one another, separated by two railway lines, the wall 11 is arranged between the two lines in order to reflect the wave emitted 10 toward the platform 3.

Figure 3C:
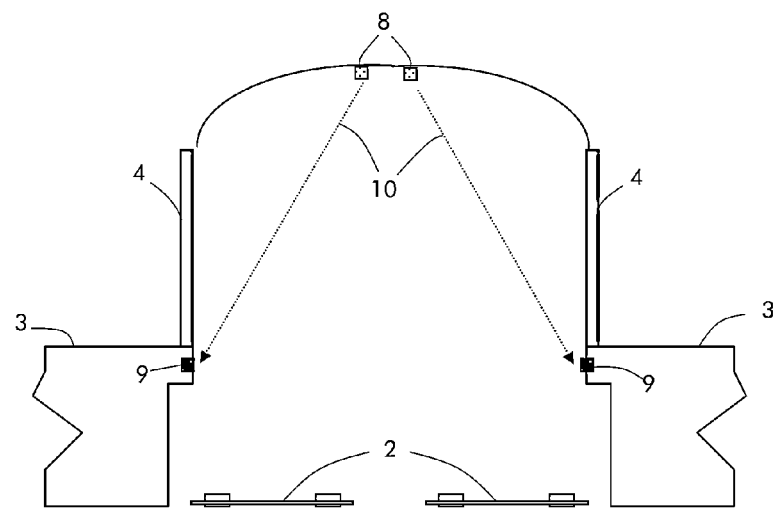
FIG. 3c is a cross-sectional diagrammatic view of a third embodiment of the invention.

In a variant as represented by FIG. 3c, a fall detection device 7 comprises a single emitter 8 arranged vertical to the line 2, in the roof 11 of the tunnel, substantially in the median plane of the door opening area 5, and a series of sensors 9 arranged under the shoulder 6 of the platform 3, in at least the entire door opening area 5. The emitter 8 emits a beam 10 which sweeps the area covered by the sensors 9.

Optionally, the fall prevention and detection device 1 comprises one or more devices for detecting entry into the station 7' (indicated by lines in FIG. 2) arranged in one or more areas of the platform 3 closed off by a barrier 4. Each device comprises at least one emitter 8' and a sensor 9', of the same types as those of the fall detection device 7 and operating in the same manner. Their function here, however, is not to detect the falling of an object or of a person on the line 2, but to detect the entry of a vehicle V into the station. To this end, a device for detecting entry into the station 7' may comprise only one emitter 8'/sensor 9' assembly or a few emitters 8'/and sensors 9', spaced apart by at least 50 cm and at most 10 m, preferentially spaced apart by one meter, under the shoulder 6 of the platform 3. For an economical version, only one area closed off by a barrier 4, arranged at the end of the platform 2 just at the station entry, may be provided with this device 7'.

Figure 4:
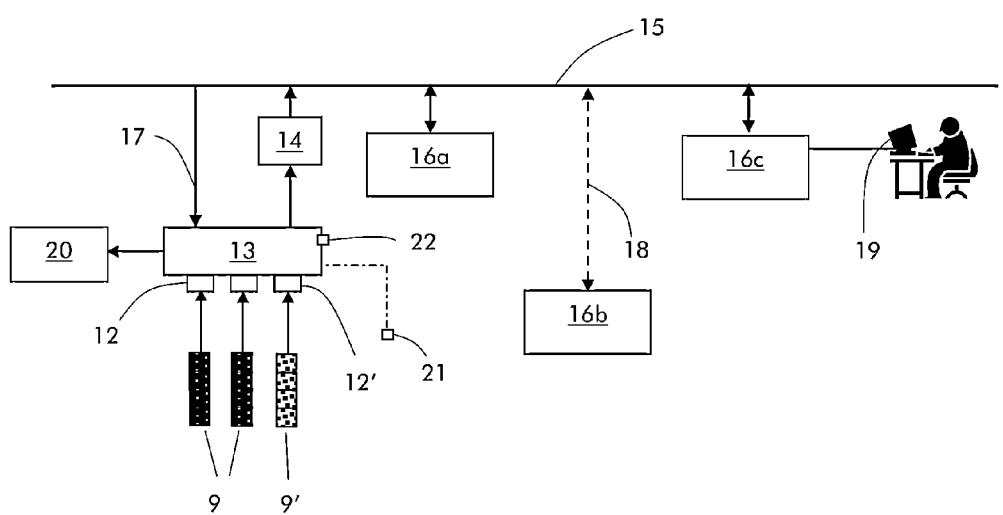
FIG. 4 is a diagrammatic view of the device according to the invention incorporated in a railway line signaling system.

Finally, as shown in FIG. 4, the fall prevention and detection device 1 comprises a detection calculator 13 arranged, for example, in a technical room of the station, to process the signals emitted by the sensors 9 or 9'. The outputs of the sensors 9 of a fall detection device 7 are thus connected to an input port 12 of the detection calculator 13. The input ports 12 can assume two states, one called "activated" in which the signals obtained from the sensors 9 are processed, the other called "deactivated" in which the signals obtained from the sensors 9 are not processed.

If the device according to the invention comprises a device for detecting entry into the station 7', the outputs of the sensors 9 are connected to an input port 12' of the calculator. The signals originating from these sensors 9' are always processed.

These signals are of two types, depending on whether or not the sensor 9 (or 9') detects the beam 10 emitted by the emitter 8. When the sensor 9 (or 9') detects a beam 10, it sends the "visible" signal to the detection calculator 13. When the sensor 9 (or 9') does not detect any beam 10—for example because an object has fallen on the line 2 or a train is stopped at the station, it sends the "masked" signal to the detection calculator 13.

The detection calculator 13 is linked to an input/output 14 that is able to safely transmit information to a signaling system 16 via a wired communication means 15, for example an ethernet bus. The detection calculator 13 also comprises an input port 17 for receiving non-vital data transmitted by the wired communication means 15.

In this example, the signaling system 16 may conventionally include one or more line signaling systems 16a, an onboard signaling system 16b on board each vehicle traveling on the line 2, and one or more supervisory signaling systems 16c.

The line signaling systems 16a comprise signaling equipment on the line of the station (signals, switch points, beacons, line circuits, etc.), the associated equipment for controlling such equipment (initiating calculator, switch point motors, etc.), and equipment handling processing operations common to all the trains (calculators processing the spacing, the interface between the onboard system 16b and the initiating calculator, etc.).

Each onboard signaling system 16b comprises wireless communication means 18 for communicating via the wired communication means 15 with the line 16a and centralized 16c signaling systems, and with the detection calculator 13. It also comprises means for ascertaining its position on the line.

Each supervisory signaling system 16c is linked to a human-machine interface 19. It manages the non-vital operational information of the signaling system: state of the equipment (failures or malfunctions of the sensors, emitters, etc.), alarms, etc. It enables an operator to give orders to the various equipment items connected to the wired communication means 15 and to control such equipment.

Moreover, in the example of a subway station described here, the vehicles are supplied with energy by a power supply device positioned on the ground—called 3rd rail, which for example carries a voltage of 750 V—by means of a shoe that is in friction contact with this 3rd rail. The station then includes an energy supply control device 20 which can be used to cut off the supply manually to avoid electrocuting people who descend onto the lines, for example to perform maintenance operations or tests. The power supply is also restored by means of this energy supply control device 20 when the people have left the line.

In this case, the detection calculator 13 is connected to the energy supply control device 20 of the station and can safely communicate with it to order it, for example, to cut off the energy supply or restore it.

In a variant, the device 1 according to the invention can be applied to other rail systems in which the supply is by means of an overhead catenary wire. A person falling on the lines does not therefore risk being electrocuted. If the station has an energy supply control device 20, there is no need in this case to connect it to the detection calculator 13.

Optionally, the detection calculator 13 comprises an alarm button 21, arranged, for example, on the platform 3 and linked to the calculator 13 by a cable (represented by a chain-dotted line in FIG. 4), enabling a person on the platform to control the application of the same processing operations as those performed automatically in the case of the detection of the falling of a person (cutting off the energy supply and preventing the train from entering the station). The information indicating activation of the alarm button 21 triggers processing operations that are identical for the detection calculator 13 to those performed if the falling of an object or of a person is detected.

Also as an option, the detection calculator 13 comprises a button for restoring the power supply 22, access to which is restricted. It is, for example, arranged on the calculator in the technical room or remotely in a cabinet arranged on the platform and accessible only by key.

The operation of the fall prevention and detection device 1 is described in relation to FIGS. 2, 4 and the embodiment of FIG. 3a.

By default, the input ports 12 of the detection calculator device 13 are each in the so-called "activated" state. In nominal operation, the emitters 8 emit beams 10, for example infra-red, which are picked up by the sensors 9. The "visible" signals are sent to the input ports 12 of the detection calculator 13. When an object or a person falls on the line 2, in one of the door opening areas 5, one or more beams 10 are interrupted and one or more sensors 9 send the "masked" signal to the detection calculator 13. On receiving this signal, the detection calculator 13 safely emits, via the input/output 14, an "entry to station prohibited" information item to the line 16a or onboard 16b signaling system. This information item is processed by the calculator triggering the line signaling system 16a, which then modifies the state of the line equipment to prevent an approaching vehicle from entering into the station, for example by switching a signal arranged at the station entry to red. It may also, by means of one of the equipment items handling the processing operations common to all the trains of the line signaling system 16a, to prevent the onboard signaling system 16b from entering the station and require the onboard system 16b of a train already partly in the station to be immobilized. The processing of the information by the calculator initiating the line signaling system 16a offers the advantage of not presupposing that all the trains traveling on the line are equipped with an onboard signaling system 16b, but does require a signal at the entry to each station. The processing of the information by the equipment handling the processing operations common to all the trains of the system 16a and by the onboard signaling system 16b does not require signals at the entry to each station, but presupposes that all the trains are equipped with the onboard signaling system 16b.

Simultaneously, the detection calculator 13 emits an alarm that is displayed on the human-machine interface 19 and that indicates a fall to the operator.

If a station has a 3rd rail, the detection calculator 13 also orders the energy supply control device 20 to cut off the station's energy supply.

Because of this, no train enters into the station, an operator is notified of the fall by an alarm and the current is cut off, in order to avoid any electrocution. The operator can ask a team to intervene and return the object or the person to the platform, and supervise the operation, for example, using video cameras installed in the station.

When the object or the person has been returned and any risk deflected, the operator restores the station's energy supply, either manually by means of the button for restoring the power supply 22 or by means of information sent via the human-machine interface 19 to the detection calculator 13. The detection calculator then stops emitting the "entry to station prohibited" information item to the line signaling system 16a. The latter then modifies the state of the line equipment to allow an approaching vehicle to enter into the station, for example by switching a signal arranged at the entry to the station to green or by re-enabling train movements in the station.

When a vehicle approaches the station, the detection calculator 13 must be alerted to its imminent entry in order not to emit false alarms or false "entry into station prohibited" information items when the vehicle cuts off the emitted beams 10. This warning can be given in two different ways, depending on whether the system 1 includes or does not include a device for detecting entry into the station 7'.

When the device 1 according to the invention does not comprise any device for detecting entry into a station 7', the detection calculator 13 uses the information concerning the position of the vehicle V. The latter is sent by the onboard signaling system 16b to the wired communication means 15 by means of wireless communication 18. The detection calculator 13 receives this information item at the input port 17 and processes it in order to modify the state of its input ports 12 from the "activated" mode to the "deactivated" mode. Each of the elements involved in the communication chain (the onboard signaling system 16b, the wireless communication means 18, the wired communication means 15, the detection calculator 13) has a cycle time for sending and receiving the data. These cycle times are aggregated with one another and the sum constitutes a delay called shadow region in front of the train, a region in which the exact position of the vehicle is unknown. The shadow region is of the order of a few seconds. This solution offers the advantage of requiring no additional sensors and emitters but, on the other hand, does require the state of the input ports 12 to be changed a few seconds before the vehicle actually enters into the station. During these few seconds, a fall will not be detected.

When the device 1 according to the invention comprises at least one device for detecting entry into the station 7' and the detection calculator 13 receives a "masked" signal from a sensor 9' of the device for detecting entry into the station 7', it locally processes this information item to progressively change the state of the input ports 12 of the sensors 9 of the detection devices 7 from the "activated" state to a "deactivated" state. This modification is made very rapidly since the processing time for this signal depends only on the detection calculator 13. Thus, when a vehicle cuts off the sensors 9' of the device for detecting entry into the station 7' arranged at the station entry, the detection calculator 13 first modifies the state of the input port 12 of the detection device 7 arranged in the first door opening area that is adjacent to it. The detection calculator then uses the "masked" signals emitted by the sensors 9 of the detection device 7 whose beams are cut by the entering vehicle to modify the state of the input port 12 of the detection device 7 arranged in the second door opening area. The process is repeated in this way for all the input ports 12 of all the fall detection devices 7 of the platform 3. Thus, as the vehicle enters into the station and the beams 10 from the emitters 8 are cut, the "masked" signal no longer generates the emission of alarms and "entry to station prohibited" information items.

This solution offers the advantage of drastically reducing the shadow region in front of the train, but, on the other hand, requires at least one additional sensor to be placed at the station entry, or at each end of the platform if the line is two-way.

To further reduce the shadow region in front of the train, it is possible to provide a device for detecting entry into the station 7' in one or more additional areas closed off by a barrier 4, whose operation is identical to that described previously.

When stopped, the vehicle V cuts all the wave beams 10 from all the sensors 9 (and possibly 9') of the platform. All the sensors therefore send the "masked" signal to their respective input ports 12 (and possibly 12'). The doors open in the door opening areas 5, and the passengers get on the vehicle and off it.

When the vehicle V starts up again and leaves the station, the detection calculator 13 must be informed of this departure to switch the states of the input ports 12 to the "activated" mode. In the same way as previously, the calculator 13 may either obtain the information by the onboard signaling system 16b via the wired communication means 15, or obtain the information by means of the "visible" signal sent by the sensor or sensors 9' of the device for detecting entry into the station 7' which are arranged at the station entry and are the first to re-detect the beams 10 emitted. In both cases, the detection calculator 13 progressively modifies the state of its input ports 12 from the "deactivated" mode to the "activated" mode as and when the sensors 9 of the fall detection devices 7 send the "visible" signal. The detection calculator 13 is therefore once again in monitoring mode and able to detect and declare a fall.

When one or more sensors 9 or 9' have failed and are no longer sending any signal to the detection calculator 13, their failure state is detected at the corresponding input port 12.

The detection calculator 13 then reports this failure to the central signaling system 16c, where the failure is displayed on the human-machine interface 19, or sends the information directly to the human-machine interface 19. An operator can then reconfigure the detection devices 7 by means of this interface 19, for example by asking the detection calculator 13 to consider only the information sent by certain sensors, in a so-called degraded mode. This makes it possible to continue to detect falls and emit alarms pending the replacement of the defective elements.

The fall prevention and detection device 1 according to the invention offers numerous advantages. First of all, it is a simple device with no moving members, which simplifies maintenance. Next, it prevents falls over a large part of the platform and, in the door opening areas 5, it is capable of detecting a fall and declaring it at a cost well below the solutions of the prior art, since it uses a lot less equipment. Finally, this device remains effective even when the vehicle enters into a station.

Although the invention has been described in conjunction with a particular embodiment it is obviously not limited thereto and includes all the technical equivalents of the means described and their combinations, provided that the latter fall within the context of the invention.

The invention claimed is:

1. A device for preventing and detecting the falling of an object or of a person on a line of a railway station having a platform, comprising:
   at least one detection device having at least one emitter of a beam and a sensor able to detect the beam; and
   a detection calculator for processing signals obtained from the sensors and configured to communicate safely with at least one signaling system of the railway station,
   wherein the device comprises barriers configured to be arranged on the platform to prevent falls of the object or of the person, the barriers delimiting between door opening areas, the detection device being arranged in each of the door opening areas to detect a fall on the line of the railway station.

2. The device as claimed in claim 1, wherein outputs of the sensors are connected to at least one input port of the detection calculator, which is either in an activated state in which the signals obtained from the sensors are processed, or in a deactivated state in which the signals obtained from the sensors are not processed.

3. The device as claimed in claim 1, further comprising at least one device for detecting entry into the railway station configured to be arranged in at least one area of the platform closed off by a barrier.

4. The device as claimed in claim 3, wherein the device for detecting entry into the railway station comprises at least one emitter of a beam and a plurality of sensors able to detect the beam, the sensors being arranged over at least an entire length of the door opening area.

5. The device as claimed in claim 4, wherein the outputs of the sensors of the device for detecting entry into the railway station are connected to at least one input port of the detection calculator.

6. The device as claimed in claim 5, wherein the detection calculator is configured to process the signal obtained from the sensors of the device for detecting entry into the railway station to modify a state of the input port.

7. The device s claimed in claim 1, wherein the detection calculator is configured to process information concerning the position of a vehicle raveling on the line to modify a state of the input port.

8. The device as claimed in claim 6, wherein the detection calculator is configured to prevent or allow the entry into the railway station of a vehicle according to the state of the input port and the signals emitted by the sensors of the fall detection device, by means of information sent to the signaling system.

9. The device as claimed in claim 1, wherein the detection calculator is connected to an energy supply control device of the railway station and configured to order a cutting off of the energy supply to the railway station according to the state of the input port and the signals emitted by the sensors of the fall detection device, by means of information sent to said energy supply control device.

10. A method for detecting the falling of an object or of a person on a line of a railway station having a platform comprising a prevention and detection device as claimed in claim 1, comprising the following steps:
   detecting the cutting-off of at least one beam from at least one fall detection device;
   safely emitting information preventing entry into the railway station to at least one signaling system on the line or on board; and
   sending an alarm to a central signaling system.

11. The method as claimed in claim 10, also comprising a step for cutting off the railway station's energy supply.

12. The method as claimed in claim 10, comprising a step for detecting an approach of a vehicle to the railway station.

13. The method as claimed in claim 12, in which the detection calculator modifies the state of the input ports when the approach of the vehicle is detected, so as to no longer process the signals for cutting off at least one beam emitted by at least one sensor (9) of the fall detection device.

* * * * *